United States Patent
Lee (10) Patent No.: US 12,005,703 B2
(45) Date of Patent: Jun. 11, 2024

(54) PRINTER AND METHOD FOR DETECTING PRINTING PAPER

(71) Applicant: BIXOLON CO., LTD., Seongnam-si (KR)

(72) Inventor: Chul Hui Lee, Suwon-si (KR)

(73) Assignee: BIXOLON CO., LTD., Seongnam-si (KR)

( * ) Notice: Subject to any disclaimer, the term of this patent is extended or adjusted under 35 U.S.C. 154(b) by 171 days.

(21) Appl. No.: 17/789,307

(22) PCT Filed: Dec. 28, 2020

(86) PCT No.: PCT/KR2020/019183
§ 371 (c)(1),
(2) Date: Jun. 27, 2022

(87) PCT Pub. No.: WO2021/133135
PCT Pub. Date: Jul. 1, 2021

(65) Prior Publication Data
US 2023/0051994 A1 Feb. 16, 2023

(30) Foreign Application Priority Data
Dec. 27, 2019 (KR) .......................... 10-2019-0176654

(51) Int. Cl.
*B41J 11/00* (2006.01)
*B41J 3/407* (2006.01)
(Continued)

(52) U.S. Cl.
CPC ......... *B41J 11/0095* (2013.01); *B41J 3/4075* (2013.01); *B41J 11/70* (2013.01); *B41J 29/393* (2013.01)

(58) Field of Classification Search
CPC ...... B41J 11/0095; B41J 3/4075; B41J 11/70; B41J 29/393
See application file for complete search history.

(56) References Cited

U.S. PATENT DOCUMENTS

| | | | |
|---|---|---|---|
| 9,789,710 | B2 | 10/2017 | Sugimoto |
| 2011/0122096 | A1 | 5/2011 | Kim et al. |
| 2018/0060852 | A1 | 3/2018 | Eoka et al. |

FOREIGN PATENT DOCUMENTS

| CA | 2259821 A1 * | 4/1994 | ............. B41J 17/02 |
|---|---|---|---|
| JP | 2002-048876 A | 2/2002 | |

(Continued)

OTHER PUBLICATIONS

International Search Report for PCT/KR2020/019183 dated Mar. 15, 2021.

*Primary Examiner* — Justin Seo
(74) *Attorney, Agent, or Firm* — Sughrue Mion, PLLC (57) ABSTRACT

A printer includes: a transfer unit configured to transfer printing paper in a printing direction; a printing unit configured to print information on transferred printing paper; a detection unit installed to face discharged printing paper on a printing paper discharge portion side, and configured to acquire measured values by detecting light while printing paper is transferred or when the transfer of printing paper is stopped; and a control unit configured to collect measured values of the detection unit while printing paper is transferred, to calculate a reference value by using the collected measured values, and to determine whether printing paper has been removed by comparing the calculated reference value with a measured value acquired by the detection unit when the transfer of printing paper is stopped.

12 Claims, 5 Drawing Sheets

(51) Int. Cl.
*B41J 11/70* (2006.01)
*B41J 29/393* (2006.01)

(56) References Cited

FOREIGN PATENT DOCUMENTS

| | | |
|---|---|---|
| JP | 2016-137991 A | 8/2016 |
| JP | 2017-069812 A | 4/2017 |
| KR | 10-1030001 B1 | 4/2011 |
| KR | 10-2019-0044458 A | 4/2019 |

* cited by examiner

PRINTER AND METHOD FOR DETECTING PRINTING PAPER

CROSS REFERENCE TO RELATED APPLICATIONS

This application is a National Stage of International Application No. PCT/KR2020/019183 filed Dec. 28, 2020, claiming priority based on Korean Patent Application No. 10-2019-0176654 filed Dec. 27, 2019.

TECHNICAL FIELD

The embodiments disclosed herein relate to a method for detecting the presence or absence of paper in order to check whether paper on which printing has been completed has been removed from a printer, and more particularly to a printer and a method for detecting printing paper for a printer that are capable of maintaining accuracy despite environmental changes.

BACKGROUND ART

A printer is an output device that visually prints data, processed by an information processing device, on paper. In general, printers print information on transferred paper while transferring the paper.

Printing paper may have a variety of structures depending on the purpose and content of printing, as in paper composed of a single layer, paper composed of multiple layers including front paper having an adhesive applied onto the back side thereof and back paper protecting the adhesive layer of the front paper, roll-type paper configured such that printing paper extended long is wound therein, and paper configured such that a plurality of sheets of paper is stacked therein. In addition, in the case of label paper, it may have a structure in which sheets of front paper separated at regular intervals are successively adhered to back paper extended long.

In particular, printing paper used in small printers, such as receipt printers or label printers, or in mobile printers is often constructed as roll-type paper. In particular, printers using such roll-type paper additionally include a configuration for cutting or separating printed paper.

For example, a cutter may be provided on a printing paper discharge portion side in order to automatically or manually cut the unwound portion of printing paper when the front end of the printed paper is unwound out of a printer in the state in which the printing paper is accommodated in the printer.

Alternatively, as another example, a label printer using printing paper including front paper and back paper may be provided with a peeler that separates the front paper and the back paper and unwinds them separately.

In such printers, when printed paper is loaded onto a discharge portion side without being cut or separated, it may interfere with subsequent printing work or cause inconvenience to work using printed paper.

For example, when an adhesive is applied onto the back surface of printing paper, a problem may arise in that sheets of printed paper may be adhered to each other, and may not be separated or may be torn. In particular, when front paper and back paper are discharged in a separated state by a peeler, a problem may arise in that sheets of front paper are attached to each other and are not separated from each other. In addition, when labels or barcodes are printed, one unrolled print must be accurately attached to a target product, so that it is necessary to perform control so that only one print is output at one time.

Accordingly, in this case, it is necessary to detect whether printing paper remains on the printing paper discharge portion side and then control whether to perform additional printing. To this end, conventionally, an optical sensor is disposed on a printing paper discharge portion side, and the presence or absence of printing paper is detected using the difference between the amount of light measured when printing paper is loaded onto a discharge portion and the amount of light measured when printing paper is removed.

However, in the conventional art, the presence or absence of paper is simply determined using a measured value measured by the optical sensor based on a predetermined fixed value, so that the possibility of error is high. In order to reduce the occurrence of errors and selectively apply a reference value suitable for a usage environment, some printers employ a technology that calibrates and then sets a reference value. Also in this case, a measured value of the optical sensor is compared with the single fixed value, so that many errors occur depending on the usage environment.

In particular, in the case of a mobile printer, a usage environment may change in real time. Particularly, since a paper detection sensor is composed of an optical sensor, it is sensitive to a change in the amount of light caused by lighting or sunlight. Accordingly, there is a problem in that the accuracy of the detection of the presence or absence of paper cannot be guaranteed using only one reference value when the printer is used in various environments.

In relation to this, Korean Patent Application Publication No. 10-2017-0088273 entitled 'Image Formation Device' discloses a technology that detects whether printing paper is normal by using an optical sensor. This technology determines only whether printing paper is normal by using a preset threshold value as described above, but does not disclose a method for improving the accuracy of detection in a situation in which a usage environment changes dynamically, as in a mobile device.

Therefore, there is a demand for a means for overcoming the above-described problems.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

DISCLOSURE

Technical Problem

The embodiments disclosed herein are intended to provide a printer and a method for detecting printing paper for a printer that are capable of minimizing the operation error of the printer by accurately detecting whether printing paper remains in the discharge portion of the printer.

The embodiments disclosed herein are intended to provide a printer and a method for detecting printing paper for a printer that are optimized for a case where a usage environment changes every time, as in a mobile printer, by adaptively changing a reference value for the detection of the presence or absence of printing paper in response to a change in the usage environment of the printer.

Furthermore, the embodiments disclosed herein are intended to provide a printer and a method for detecting printing paper for a printer that are capable of minimizing the inconvenience of use by actively changing a reference value according to an environment even when a printer user does not manually change the setting of the reference value for the detection of the printing paper.

Technical Solution

In the embodiments disclosed herein in order to solve the above-described technical problems, measured values of a detection unit that is installed to face printing paper and detects light are collected during the transfer of printing paper, and it is determined whether printing paper has been removed by comparing a reference value calculated using the collected measured values with a measured value acquired by the detection unit in the state where the transfer of printing paper is stopped.

Advantageous Effects

According to any one of the above-described technical solutions, the embodiments disclosed herein may provide the printer and the method for detecting printing paper for a printer that are capable of minimizing the operation error of the printer by accurately detecting whether printing paper remains in the discharge portion of the printer.

The embodiments disclosed herein may provide the printer and the method for detecting printing paper for a printer that are optimized for a case where a usage environment changes every time, as in a mobile printer, by adaptively changing a reference value for the detection of the presence or absence of printing paper in response to a change in the usage environment of the printer.

Furthermore, the embodiments disclosed herein may provide the printer and the method for detecting printing paper for a printer that are capable of minimizing the inconvenience of use by actively changing a reference value according to an environment even when a printer user does not manually change the setting of the reference value for the detection of the printing paper.

The effects that can be obtained by the embodiments disclosed herein are not limited to the above-described effects, and other effects that have not been described above will be clearly understood by those having ordinary skill in the art, to which the described embodiments pertain, from the following description.

BEST MODE

As a technical solution for overcoming the above-described technical problem, according to an embodiment, there is provided a printer including: a transfer unit configured to transfer printing paper in a printing direction; a printing unit configured to print information on transferred printing paper; a detection unit installed to face discharged printing paper on a printing paper discharge portion side, and configured to acquire measured values by detecting light while printing paper is transferred or when the transfer of printing paper is stopped; and a control unit configured to collect measured values of the detection unit while printing paper is transferred, to calculate a reference value by using the collected measured values, and to determine whether printing paper has been removed by comparing the calculated reference value with a measured value acquired by the detection unit when the transfer of printing paper is stopped.

According to another embodiment, there is provided a method for detecting printing paper, the method being performed by a printer, the method including: printing information on printing paper while transferring the printing paper in a printing direction; while printing paper is transferred, collecting measured values by using a paper sensor that is installed to face discharged printing paper on a printing paper discharge portion side and detects light; setting a reference value by using the collected measured values; and when the transfer of printing paper is stopped, determining whether printing paper has been removed by comparing the reference value with a measured value acquired using the paper sensor.

According to another embodiment, there is provided a computer-readable storage medium having recorded thereon a program for performing a method for detecting printing paper that is performed by a printer, wherein the method includes: printing information on printing paper while transferring the printing paper in a printing direction; while printing paper is transferred, collecting measured values by using a paper sensor that is installed to face discharged printing paper on a printing paper discharge portion side and detects light; setting a reference value by using the collected measured values; and when the transfer of printing paper is stopped, determining whether printing paper has been removed by comparing the reference value with a measured value acquired using the paper sensor.

Furthermore, there is provided a computer program, the computer program being executed by a printer and stored in a storage medium in order to perform a method for detecting printing paper, wherein the method includes: printing information on printing paper while transferring the printing paper in a printing direction; while printing paper is transferred, collecting measured values by using a paper sensor that is installed to face discharged printing paper on a printing paper discharge portion side and detects light; setting a reference value by using the collected measured values; and when the transfer of printing paper is stopped, determining whether printing paper has been removed by comparing the reference value with a measured value acquired using the paper sensor.

MODE FOR INVENTION

Various embodiments will be described in detail below with reference to the accompanying drawings. The following embodiments may be modified to various different forms and then practiced. In order to more clearly illustrate features of the embodiments, detailed descriptions of items that are well known to those of ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected" to another component, this includes not only a case where the one component is "directly connected" to the other component but also a case where the one component is "connected to the other component with a third component disposed therebetween." Furthermore, when one portion is described as "including" one component, this does not mean that the portion does not exclude another component but means that the portion may further include another component, unless explicitly described to the contrary.

The embodiments will be described in detail below with reference to the accompanying drawings.

Figure 1:
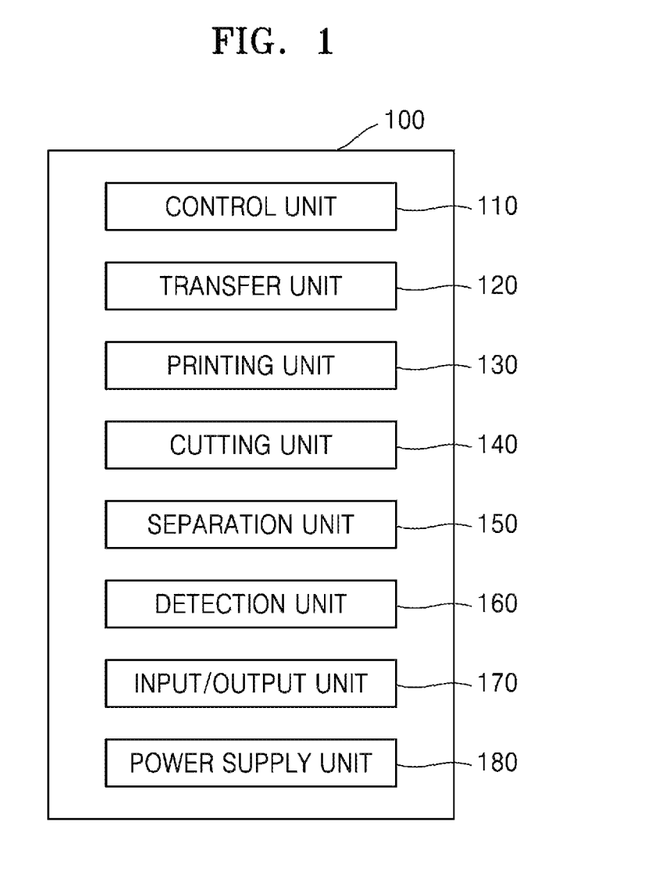
FIG. 1 is a block diagram showing the configuration of a printer according to an embodiment.
Figure 2:
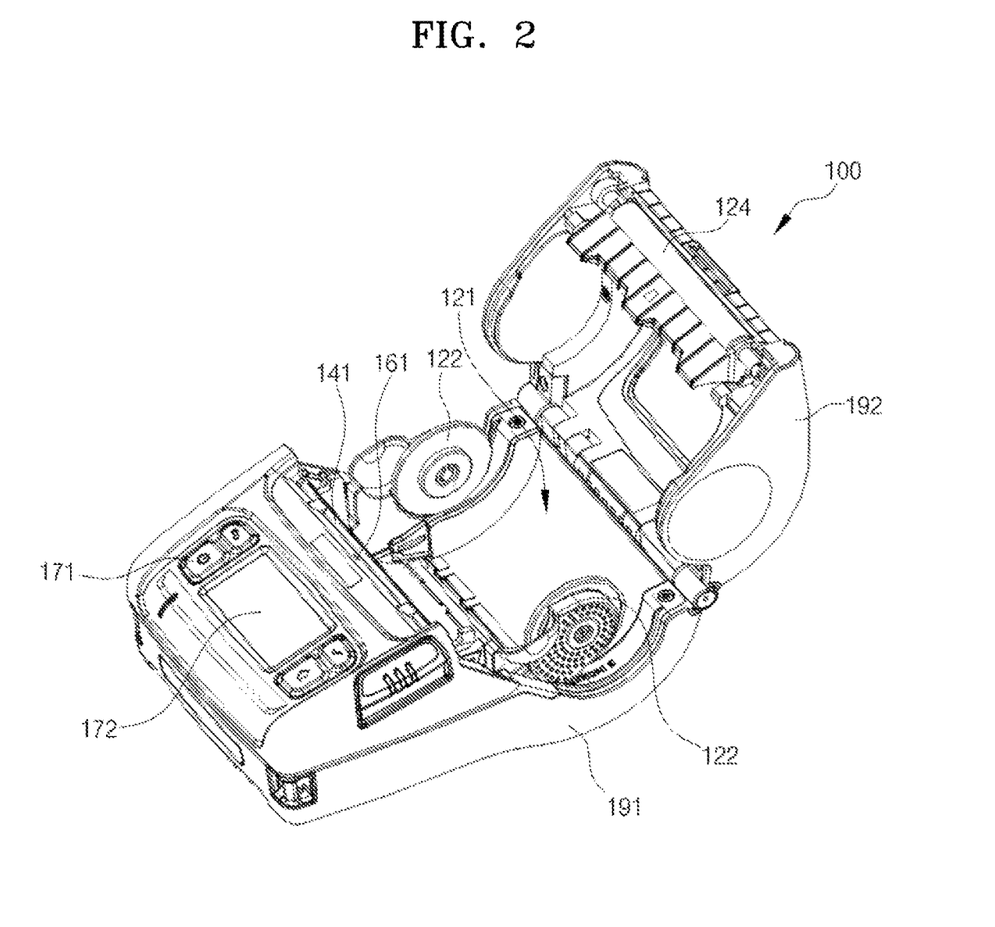
FIG. 2 is a perspective view showing the appearance of the printer according to the embodiment.

FIG. 1 is a block diagram showing the configuration of a printer according to an embodiment, and FIG. 2 is a perspective view showing the appearance of the printer according to the embodiment.

Referring to FIGS. 1 and 2, a printer 100 may be any type of printing device that visually outputs various types of information onto printing paper. For example, it may be an impact printer such as a dot printer, and a non-impact printer such as an inkjet printer, a laser printer, or a thermal transfer printer. In particular, the printer 100 may be a type of printer that accommodates roll-type printing paper therein and discharges the front end of the printing paper, on which printing is completed, out of the printer. Furthermore, the printer 100 may use printing paper having an adhesive applied thereto, and may be a printer using printing paper, including back paper for protecting a back surface onto which an adhesive is applied.

Furthermore, the printer 100 may be a mobile printer using a battery (not shown).

The printer 100 includes a control unit 110. The control unit 110 is responsible for the overall control of the printer 100 described above. More specifically, the control unit 110 is responsible for the computation of data and the interpretation and execution of instructions. Accordingly, the operations of hardware components to be described later are controlled as a result of the execution of an instruction by the control unit 110.

In particular, the control unit 110 serves to determine whether printed paper discharged to the discharge portion side of the printer 100 in a completed state has been removed. To this end, the control unit 110 compares a measured value of a detection unit 160 to be described later with a reference value. In this case, the reference value may be a value that is updated every time according to a usage environment, and the control unit 110 may calculate the reference value whenever printing is performed. This will be described later.

Meanwhile, the printer 100 may include a transfer unit 120. The transfer unit 120 may include transfer means for printing paper on which information is to be printed using the printer 100.

Referring to the embodiment shown in FIG. 2, the transfer unit 120 may include a paper accommodation portion 121 configured to accommodate printing paper. The paper accommodation portion 121 is an accommodation space for roll-type printing paper or a plurality of stacked sheets of printing paper.

In addition, the transfer unit 120 may include a paper unwinding unit 122. The paper unwinding unit 122 may be configured, for example, to freely rotate while supporting both ends of roll-type printing paper or to provide rotational force for the unwinding of printing paper.

Furthermore, the transfer unit 120 may include a transfer roller 124. The transfer roller 124 is configured to come into close contact with one surface of the printing paper and to rotate in order to move the printing paper in a transfer direction. The transfer roller 124 may include one or more transfer rollers 124. In particular, the transfer roller 124 is configured to face the print head (not shown) of the print unit 130 to be described later, so that the printing paper may be transferred in the state of being in close contact with the print head.

Meanwhile, the printer 100 may include a printing unit 130. The printing unit 130 is a means for visually outputting information onto the printing paper transferred by the transfer unit 120. The printing unit 130 may include a print head having a configuration varying depending on the type of printer, and the print head may be, for example, a thermal printing head (TPH) in a thermal transfer printer. In the embodiment shown in FIG. 2, the print head may be arranged, for example, below a cutter 141 to be described later.

In the printer 100 according to the embodiment shown in FIG. 2, the printing unit 130 prints information by applying heat to the printing paper that is being transported in the state of being in close contact with the print head.

Furthermore, the printer 100 may include a cutting unit 140. The cutting unit 140 serves to separate the printing paper accommodated in the printer 100 and the printed front end of the printing paper by cutting the front end of the printing paper. In particular, when there is used roll-type printing paper in which printing paper is elongated in the longitudinal direction thereof, it may be provided in the printer 100.

The cutting unit 140 may include a cutter 141 arranged perpendicular to the transfer direction of the printing paper at the front end of the printed printing paper. FIG. 2 illustrates a manual cutter that includes only one blade, and can thus cut printing paper by applying external force to the blade side thereof. The cutting unit 140 may include an automatic cutter in which two blades are disposed opposite to the printing and back surfaces of printing paper, respectively, and may automatically cut the printing paper.

Meanwhile, the printer 100 may optionally include a separation unit 150. The separation unit 150 is a component that separates and discharges front paper, on which information is printed, and back paper when the printing paper is configured to include the front paper and the back paper, and is also called a peeler. The separation unit 150 has one discharge portion configured such that front paper is discharged therethrough and the other discharge portion configured such that back paper is discharged therethrough, and separates and discharges the front paper and back paper of the front end of the printing paper. In this case, when the printer 100 includes the above-described cutting unit 140, the cutting unit 140 may be constructed in the discharge portion through which the front paper is discharged. It is obvious that a separate cutter may also be provided in the discharge portion through which the back paper is discharged.

However, the cutting unit 140 is not necessarily constructed in the printer 100 in which the separation unit 150 is constructed. For example, as for label printing paper, front paper is already arranged on back paper in the state of being cut in accordance with label specifications, and the separated front paper is discharged through the front paper discharge portion, so that the separation unit 150 may not be constructed on the front paper discharge portion side.

In addition, the printer 100 may include the detection unit 160. The detection unit 160 is a component that is disposed outside the discharge portion for printing paper and checks whether printed paper has been removed from the printer 100. The detection unit 160 may be installed to face discharged printing paper, and may acquire a measured value by detecting light while the printing paper is being transferred or when the printing paper is stopped. As shown in FIG. 2, the detection unit may include a paper sensor 161 configured to detect light, in which case the paper sensor 161 is an optical sensor configured to measure the physical quantity of received light, e.g., the quantity of light or light energy. In this case, the light is not limited to visible light, but may include an infrared ray, an ultraviolet ray, electromagnetic waves, and the like. The paper sensor 161 may include a sensor element configured to receive light in a specific range of wavelengths and output the physical quantity of light as an electrical signal, and may be, e.g., an infrared sensor. Furthermore, in this case, the paper sensor 161 may be formed as a component configured to passively receive light, and may also be provided as an active sensor configured to emit light in a specific range of wavelengths and then receive light of a corresponding wavelength.

The detection unit 160 may acquire a measured value not only in a situation in which it is necessary to detect whether printing paper has been removed, i.e., in the state in which printing is stopped, but also in the middle of transferring the printing paper. In addition, a measured value acquired by the detection unit 160 may be transmitted to the control unit 110, collected by the control unit 110, and stored at least temporarily.

In this case, the detection unit 160 may be provided on the discharge portion side as described above. More specifically, it may be disposed within a predetermined range behind the discharge portion based on the transfer direction of the printing paper.

In this case, the above-described discharge portion refers to an unwinding hole for printing paper that is formed through cooperation between a main body 191 and a cover 192 in the state in which the inside of the printer 100 is shielded in such a manner that the cover 192 to be described later is coupled to the main body 191 in the embodiment shown in FIG. 2. Accordingly, the discharge portion may be formed to have at least a shape corresponding to the cross-section of the printing paper, and may be formed to be larger than the length and width of the cross-section of the printing paper so that the printing paper can be unwound out of the printer 100. In addition, the above-described cutting unit 140 may be disposed approximately within a predetermined range in front of or behind the discharge portion based on the transfer direction of the printing paper.

More specifically, the cutting unit 140 may be arranged first based on the transfer direction of the printing paper, and the detection unit 160 may be located behind the cutting unit 140.

For example, as shown in FIG. 2, the cutter 141 of the cutting unit 140 may be arranged, and the paper sensor 161 may be provided at the center in the longitudinal direction of the cutter 141 behind the cutter 141.

Meanwhile, the printer 100 may include an input/output unit 170. The input/output unit 170 is a component responsible for the interface between a user and the printer 100, and may include an input means for receiving the input of the user and an output means for displaying information about the status of the printer 100, a processing result for an input, and/or the like.

In this case, the input means may be include, e.g., a keyboard, a mouse, a touch panel, and/or the like, the output means may include a display panel, and/or the like, and the input means and the output means may include a single integrated input/output means such as a touch screen.

FIG. 2 shows an example including a plurality of input buttons 171 and an LCD monitor 172 as the configuration of the input/output unit 170.

Meanwhile, the printer 100 may include a power supply unit 180. The power supply unit 180 may be a means for receiving external AC power and converting it into DC power suitable for the printer 100, or may be a battery or the like. In particular, when the printer 100 is a mobile printer, a battery may be provided as the power supply unit 180.

Meanwhile, as shown in FIG. 2, the printer 100 may include the main body 191 and the cover 192. Main components such as the control unit 110, printing unit 130, and input/output unit 170 of the printer 100 may be disposed in the main body 191.

Meanwhile, the cover 192 may selectively open and close the paper accommodation portion 121 while covering the upper portion of the main body 191. However, this is merely one embodiment, and the printer 100 may have a different configuration.

In this case, the above-described control unit 110 may detect whether printing paper has been removed by using a measured value of the detection unit 160. More specifically, the control unit 110 may detect whether printing paper has been removed by comparing a measured value detected by the detection unit 160 with a reference value. In other words, the control unit 110 may determine that the printing paper has been removed when a measured value out of a corresponding range is acquired, based on the measured values of the detection unit 160 in the case where the printing paper has not been removed. Alternatively, the control unit 110 may determine that the printing paper has been removed when a measured value included in a corresponding range is acquired, based on the measured values of the detection unit 160 in the case where the printing paper has been removed.

Alternatively, the control unit 110 may collect measured values of the detection unit 160, may convert them into specific intermediate values, and may store the specific intermediate values. In addition, even when a reference value is calculated, collected measured values may be converted into intermediate values, and then the reference value may be set using the intermediate values. Thereafter, even when a measured value of the detection unit 160 is compared with the reference value, the control unit 110 may determine whether printing paper has been removed by converting the measured value into an intermediate value and then comparing it with the reference value.

For example, the control unit 110 may collect measured values of the detection unit 160, and may convert them into intermediate values on a per-unit time basis. Accordingly, a reference value may also be calculated as a time-based value. Furthermore, when it is determined whether printing paper has been removed, whether printing paper has been removed may be determined by converting a real-time measured value of the detection unit 160 into an intermediate value on a per-unit time basis and then comparing the intermediate value with the reference value. In such an embodiment, for example, there may be a case where the detection unit 160 is provided as an infrared active sensor and it is determined whether printing paper has been removed by using the time during which emitted light is received. When the detection unit 160 neither directly converts a measured value into a value on a per-unit time basis nor transmits it to the control unit 110, the control unit 110 may receive a measured value of the detection unit 160, may calculate the time it takes for emitted light to be received, and may collect the calculated time as a measured value. Accordingly, a reference value may also be determined as a value on a per-unit time basis. In addition, even when it is actually determined whether printing paper has been removed, a measured value of the detection unit 160 may be converted into an intermediate value on a per-unit time basis, and the intermediate value may be compared with the reference value.

However, whether an intermediate value is used as described above may vary depending on a physical quantity output by the sensor of the detection unit 160 and a method of determining whether printing paper has been removed. For example, as described above, it may be determined whether printing paper has been removed by using the difference in the amount of light received by the detection unit 160 between a case where there is printing paper and a case where there is no printing paper. Alternatively, it may be determined whether printing paper has been removed by using the difference in the time it takes for light to be received between a case where there is printing paper and a case where there is no printing paper. The type of sensor included in the detection unit 160 may vary depending on the method of determining whether printing paper has been removed. Also, whether the control unit 110 uses an intermediate value may vary depending on the method of determining whether printing paper has been removed.

The more detailed operation of the above-described printer 100 will be described later with reference to FIGS. 3 to 5.

Figure 3:
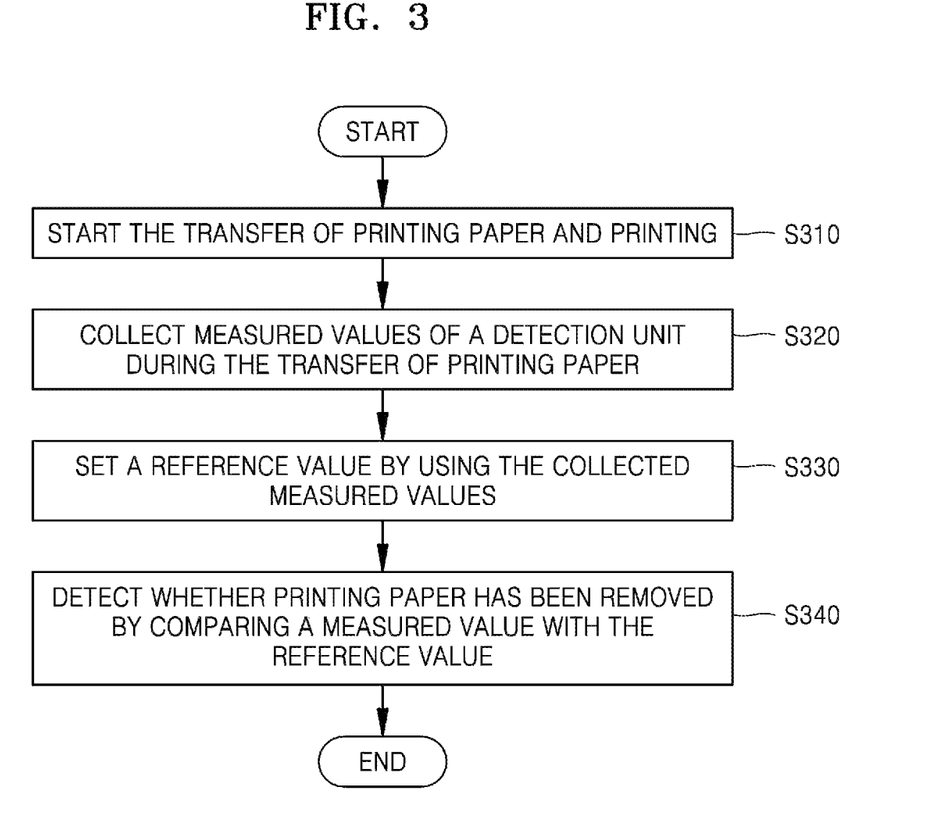
FIGS. 3 to 5 are flowcharts showing a method for detecting printing paper for a printer according to an embodiment in a stepwise manner.
Figure 4:
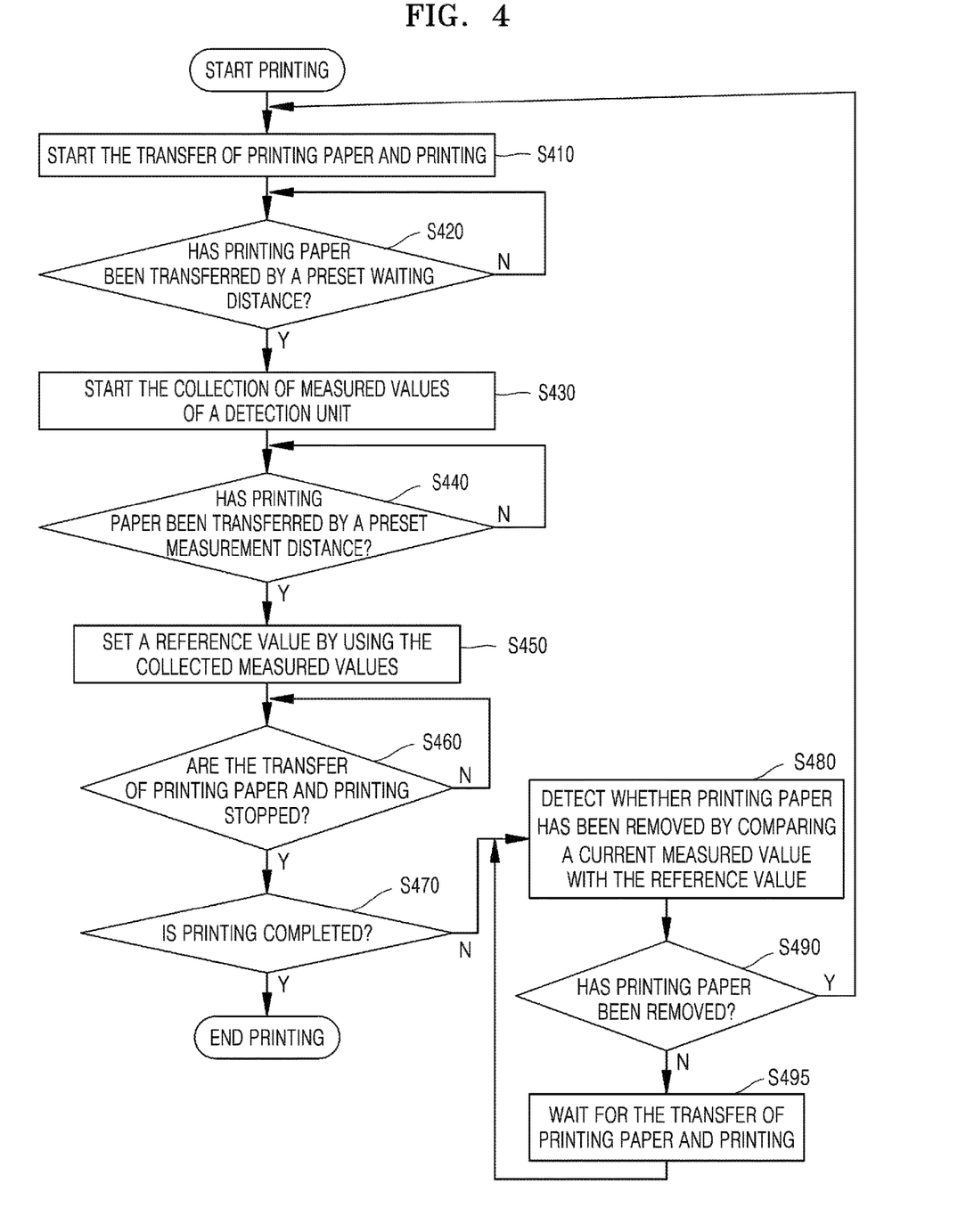
Figure 5:
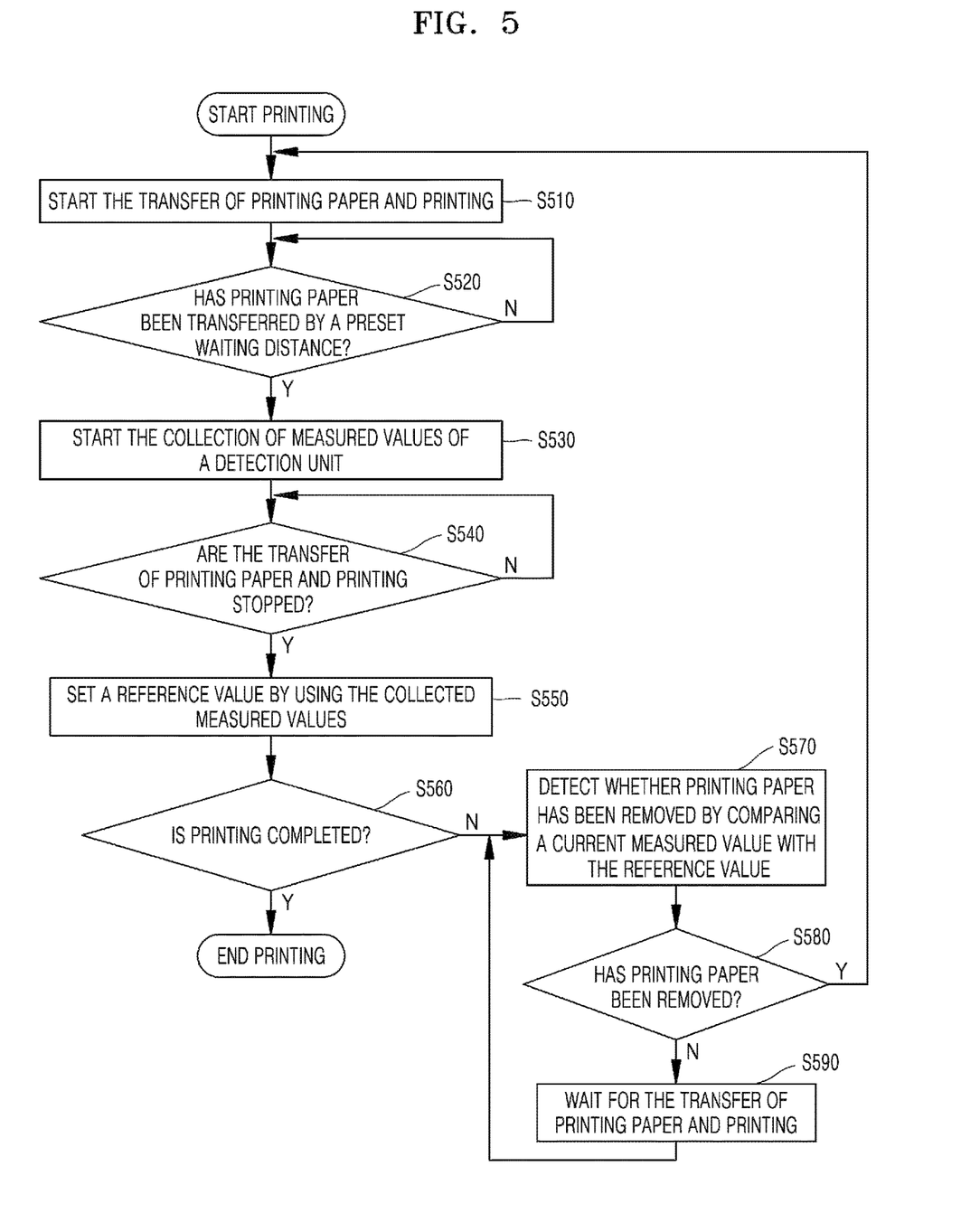

FIGS. 3 to 5 are flowcharts showing a method for detecting printing paper for a printer according to an embodiment in a stepwise manner.

First, as shown in FIG. 3, in the printer 100 according to an embodiment, there is performed step S310 in which power is supplied to the printer 100 and thus the transfer unit 120 and the printing unit 130 start the transfer of printing paper and printing under the control of the control unit 110 in the state in which the printer 100 operates. Accordingly, after step S310, there is performed the process in which printing is performed while the printing paper is transferred.

Thereafter, in step S320, the control unit 110 of the printer 100 may collect measured values of the detection unit 160 in the state in which the printing paper is transferred. As described above, the detection unit 160 may acquire measured values by detecting light in front thereof, and the control unit 110 may collect and store the measured values from the detection unit 160.

Thereafter, the control unit 110 of the printer 100 may set a reference value by using the collected measured values in step S330. To this end, the control unit 110 may acquire the reference value as a result value by performing an operation using a preset function having the collected measured values as input values. In this case, the preset function may be a function for selecting a reference value out of a physical quantity range of light detected in the state in which the printing paper is located in front of the detection unit 160. For example, when the measured values measured by the detection unit 160 are the amounts of light having a wavelength corresponding to that of infrared light, a function is set to calculate a result value smaller than the minimum one of the measured values, collected while the printing paper is transferred, as the reference value. It is obvious that this is merely one embodiment but another calculation method may be applied.

Thereafter, after the transfer of the printing paper and printing have been completed, the control unit 110 of the printer 100 may detect whether printing paper has been removed by using the reference value, set in step S330, in step S340. In this case, the control unit 110 may determine whether printing paper has been removed by comparing a measured value, acquired by the detection unit 160 in real time, with the set reference value. It is obvious that in an embodiment in which the control unit 110 converts measured values of the detection unit 160 into intermediate values and uses the intermediate values, collected measured values may be converted into intermediate values and then a reference value may be calculated using the intermediate values in step S330, and a measured value acquired in real time may be converted into an intermediate value and then the intermediate value may be compared with the reference value in step S340.

Meanwhile, a more specific embodiment of the method for detecting printing paper shown in FIG. 3 is shown in FIG. 4.

When printing is started, step S410 in which the transfer unit 120 and the printing unit 130 starts the transfer of printing paper and printing under the control of the control unit 110 of the printer 100 is performed. Accordingly, after step S410, there is performed the process in which printing is performed while the printing paper is transferred.

In this case, in step S420, the control unit 110 of the printer 100 may wait without collecting a measured value of the detection unit 160 until the printing paper is transferred by a preset waiting distance after the transfer of the printing paper has been started in step S410. In this case, the waiting distance may be set to be equal to or longer than the vertical distance between the cutter 141 of the cutting unit 140 and the paper sensor 161 of the detection unit 160 in the case where the cutting unit 140 is provided in the printer 100.

This is the transfer distance through which the printing paper reaches the paper sensor 161 after being cut by the cutter 141. In this state, after printing has been started, the printing paper does not face the paper sensor 161 in front of the paper sensor 161 after the printing paper is cut by the cutter 141 and before the cut printing paper reaches the paper sensor 161. Since the reference value needs to be calculated using measured values of the detection unit 160 in the presence of the printing paper, the control unit 110 may wait without collecting a measured value until the printing paper is transferred by the waiting distance in order not to collect a measured value of the detection unit 160 in the absence of the printing paper.

In addition, when the printing paper is moved by the waiting distance, the control unit 110 may start the collection of measured values of the detection unit 160 in step S430.

In addition, when the printing paper has been transferred by a preset measurement distance in step S440, the control unit 110 may calculate and set a reference value by using the collected measured values in step S450.

In this case, the measurement distance may be set in advance. For example, in the case of a receipt printer, the measurement may generally be set to be equal to or shorter than the minimum length of a receipt. In the case of a label printer, it may be set to be equal to or shorter than the length of a unit label.

In addition, when the transfer of printing paper and printing are stopped in step S460, the control unit 110 may check whether an overall print job has been completed in step S470 and end printing.

However, when it is determined that the print job is not completed in the state in which the transfer of printing paper and printing are stopped, the control unit 110 may determine whether the paper has been removed by comparing the measured value, acquired by the detection unit 160 in real time, with the reference value, set in step S450, in step S480.

When, as a result of the determination in step S480, it is determined that printing paper has been removed, the control unit 110 may sequentially perform steps starting from step S410 in which the transfer of printing paper and printing are started because the overall print job is not completed.

However, when it is determined that the printing paper has not been removed, the control unit 110 may suspend the transfer of printing paper and printing and wait until it is determined that the printing paper has been removed in step S495.

However, in the above-described embodiment, the waiting distance and the measurement distance may be set to respective values on a per-unit time basis, and may each be determined to be the time required to transfer printing paper through the above-described waiting or measurement distance.

Meanwhile, in the embodiment of FIG. 4, the control unit 110 collects measured values of the detection unit 160 in the state in which printing paper faces the paper sensor 161 in front of the paper sensor 161, and sets a reference value by using these measured values. In contrast, the reference value may be set using measured values of the detection unit 160 collected in the state in which printing paper does not face the paper sensor 161 in front of the paper sensor 161.

More specifically, according to an embodiment, the control unit 110 may start the collection of measured values of the detection unit 160 immediately after the transfer of the printing paper has been started, and may collect measured values of the detection unit 160 only until the printing paper is transferred by the preset measurement distance. In this case, the measurement distance may be the distance through which the printing paper is transferred from the time when the transfer of the printing paper is started up to the time immediately before the printing paper faces the paper sensor 161 in front of the paper sensor 161. In detail, the measurement distance may be set to be equal to or shorter than the vertical distance between the cutter 141 of the cutting unit 140 and the paper sensor 161 of the detection unit 160 in the case where the cutting unit 140 is provided in the printer 100.

When the control unit 110 completes the setting of the reference value using the measured values of the detection unit 160 collected while the printing paper is transferred by the preset measurement distance according to the method described above, it may detect whether printing paper has been removed according to a process corresponding to steps S460 to S495 of FIG. 4, and may control the transfer of printing paper and printing according to the result of the detection.

However, when determining whether printing paper has been removed by comparing the measured value acquired by the detection unit 160 in real time with the reference value in steps S480 and S490, the control unit 110 may determine that printing paper has been removed when it is determined that the measured value acquired in real time is the same as the reference value or is located within a predetermined range from the reference value. The reason for this is that the reference value set in the above case is a value that is calculated using measured values collected in the state in which printing paper is removed.

Meanwhile, still another specific embodiment of the method for detecting printing paper shown in FIG. 3 is shown in FIG. 5.

When printing is started, the transfer unit 120 and the printing unit 130 start the transfer of printing paper and printing under the control of the control unit 110 of the printer 100 in step S510. Accordingly, after step S510, there is performed the process in which printing is performed while the printing paper is transferred.

In this case, in step S520, the control unit 110 of the printer 100 may wait without collecting a measured value of the detection unit 160 until the printing paper is transferred by a preset waiting distance after the transfer of the print paper has been started in step S510. In this case, the waiting distance is the same as described above in the embodiment of FIG. 4.

In addition, when the printing paper is moved by the waiting distance, the control unit 110 may start the collection of measured values of the detection unit 160 in step S530.

Thereafter, when the transfer of the paper and printing are stopped in step S540, the control unit 110 may calculate and set a reference value by using the collected measured values in step S550.

In addition, the control unit 110 may check whether an overall print job has been completed in step S560, and may determinate printing.

However, when it is determined that the print job is not completed in the state in which the transfer of the paper and printing are stopped, the control unit 110 may determine whether the paper has been removed in step S570 by comparing a measured value acquired by the detection unit 160 in real time with the reference value set in step S550.

When, as a result of the determination in step S570, it is determined that the printing paper has been removed in step S580, the control unit 110 may sequentially perform steps starting from step S510 in which the transfer of the printing paper and printing are resumed because the overall print job is not completed.

However, when it is determined that the printing paper has not been removed, the control unit 110 may suspend the transfer of the printing paper and printing and wait until it is determined that the printing paper has been removed in step S590.

The term 'unit' used in the above-described embodiments means software or a hardware component such as a field-programmable gate array (FPGA) or application-specific integrated circuit (ASIC), and a 'unit' performs a specific role. However, a 'unit' is not limited to software or hardware. A 'unit' may be configured to be present in an addressable storage medium, and also may be configured to run one or more processors. Accordingly, as an example, a 'unit' includes components, such as software components, object-oriented software components, class components and task components, processes, functions, attributes, procedures, subroutines, segments in program code, drivers, firmware, microcode, circuits, data, a database, data structures, tables, arrays, and variables.

Each function provided in components and 'unit(s)' may be combined into a smaller number of components and 'unit(s)' or divided into a larger number of components and 'unit(s).'

In addition, components and 'unit(s)' may be implemented to run one or more CPUs in a device or secure multimedia card.

The method for detecting printing paper for a printer according to the embodiment described with reference to FIGS. 3 to 5 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the method for detecting printing paper for a printer according to the embodiment described with reference to FIGS. 3 to 5 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the method for detecting printing paper for a printer according to the embodiment described with reference to FIGS. 3 to 5 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued via the present specification should be defined by the attached claims, rather than the detailed description. All modifications and variations which can be derived from the meanings, scopes and equivalents of the claims should be construed as falling within the scope of the present invention.

The invention claimed is:

1. A printer comprising:
a transfer unit configured to transfer printing paper in a printing direction;
a printing unit configured to print information on transferred printing paper;
a detection unit installed to face discharged printing paper on a printing paper discharge portion side, and configured to acquire measured values by detecting light while printing paper is transferred or when transfer of printing paper is stopped; and
a control unit configured to collect measured values of the detection unit while printing paper is transferred, to calculate a reference value by using the collected measured values, and to determine whether printing paper has been removed by comparing the calculated reference value with a measured value acquired by the detection unit when transfer of printing paper is stopped; and
wherein the control unit determines whether printing paper has been removed by comparing the calculated reference value with a measured value acquired by the detection unit in real time, transmits a print start command to the transfer unit and the printing unit when it is determined that printing paper has been removed, and maintains the transfer unit and the printing unit in a print waiting state when it is determined that printing paper has not been removed.

2. The printer of claim 1, wherein the control unit waits without collecting a measured value of the detection unit until printing paper is transferred by a preset waiting distance after the transfer unit has started transfer of printing paper.

3. The printer of claim 2, further comprising a cutting unit provided on the printing paper discharge portion side, and configured to include a cutter arranged perpendicular to a transfer direction of printing paper and to cut a front end of printed printing paper;
wherein the waiting distance is set to be equal to or longer than a vertical distance between the cutter of the cutting unit and the detection unit.

4. The printer of claim 1, wherein the control unit collects measured values of the detection unit from a time when collection of measured values of the detection unit is started up to a time when the transfer unit transfers printing paper by a preset measurement distance.

5. The printer of claim 1, wherein the control unit collects measured values of the detection unit from a time when collection of measured values of the detection unit is started up to a time when transfer of printing paper by the transfer unit is stopped.

6. The printer of claim 1, wherein the printer is a mobile printer that is driven by a battery.

7. A method for detecting printing paper, the method being performed by a printer, the method comprising:
- printing information on printing paper while transferring the printing paper in a printing direction;
- while printing paper is transferred, collecting measured values by using a paper sensor that is installed to face discharged printing paper on a printing paper discharge portion side and detects light;
- setting a reference value by using the collected measured values;
- when transfer of printing paper is stopped, determining whether printing paper has been removed by comparing the reference value with a measured value acquired using the paper sensor; and
- when in determining whether printing paper has been removed, it is determined that the printing paper has been removed, starting printing on printing paper; and
- when in determining whether printing paper has been removed, it is determined that the printing paper has not been removed, maintaining a print waiting state even when printing is not completed.

8. The method of claim 7, further comprising waiting without collecting a measured value of the paper sensor until printing paper is transferred by a preset waiting distance after transfer of the printing paper has been started.

9. The method of claim 8, wherein the waiting distance is set to be equal to or longer than a vertical distance between a cutter, arranged perpendicular to a transfer direction of printing paper on the printing paper discharge portion side, and the paper sensor.

10. The method of claim 7, wherein collecting the measured values comprises collecting measured values of the paper sensor from a time when collection of measured values is started up to a time when printing paper is transferred by a preset measurement distance.

11. The method of claim 7, wherein collecting the measured values comprises collecting measured values of the paper sensor from a time when collection of measured values is started up to a time when transfer of printing paper is stopped.

12. A computer-readable storage medium having recorded thereon a program for performing the method set forth in claim 7.

* * * * *